United States Patent
Ohm (10) Patent No.: US 7,906,870 B2
(45) Date of Patent: Mar. 15, 2011

(54) SYSTEM AND METHOD FOR ANTI-ISLANDING, SUCH AS ANTI-ISLANDING FOR A GRID-CONNECTED PHOTOVOLTAIC INVERTER

(75) Inventor: Dal Y. Ohm, South Riding, VA (US)

(73) Assignee: PV Powered, Inc., Bend, OR (US)

( * ) Notice: Subject to any disclaimer, the term of this patent is extended or adjusted under 35 U.S.C. 154(b) by 110 days.

(21) Appl. No.: 11/872,598

(22) Filed: Oct. 15, 2007

(65) Prior Publication Data

US 2008/0122293 A1    May 29, 2008

Related U.S. Application Data

(60) Provisional application No. 60/851,640, filed on Oct. 13, 2006.

(51) Int. Cl.
*H02J 1/00* (2006.01)
*H01H 47/20* (2006.01)
*H02H 3/00* (2006.01)

(52) U.S. Cl. ............................. 307/69; 307/129; 361/62

(58) Field of Classification Search .................... 307/43, 307/139, 69; 361/62; 324/520; 327/44
See application file for complete search history.

(56) References Cited

U.S. PATENT DOCUMENTS

| | | | |
|---|---|---|---|
| 6,101,073 A | 8/2000 | Takehara | |
| 6,107,784 A | 8/2000 | Nomiya et al. | |
| 6,201,180 B1 | 3/2001 | Meyer et al. | |
| 6,320,769 B2 | 11/2001 | Kurokami et al. | |
| 6,429,546 B1 * | 8/2002 | Ropp et al. | ........................ 307/31 |
| 6,593,520 B2 | 7/2003 | Kondo et al. | |
| 6,713,890 B2 | 3/2004 | Kondo et al. | |
| 6,750,391 B2 | 6/2004 | Bower et al. | |
| 6,803,515 B2 | 10/2004 | Itoyama et al. | |
| 6,810,339 B2 | 10/2004 | Wills | |
| 6,812,396 B2 | 11/2004 | Makita et al. | |
| 6,853,940 B2 * | 2/2005 | Tuladhar | ........................ 702/111 |
| 6,856,497 B2 | 2/2005 | Suzui et al. | |
| 6,897,370 B2 | 5/2005 | Kondo et al. | |
| 6,927,955 B2 | 8/2005 | Suzui et al. | |
| 6,930,868 B2 | 8/2005 | Kondo et al. | |
| 7,106,564 B2 | 9/2006 | Deng et al. | |
| 7,432,618 B2 * | 10/2008 | Taylor | ........................ 307/129 |
| 7,518,266 B2 * | 4/2009 | Eckroad | ........................ 307/82 |
| 2005/0045224 A1 | 3/2005 | Lyden | |

OTHER PUBLICATIONS

Dal Y. Ohm, "The Hybrid Frequency Shift (HFS) Anti-Islanding Method for Grid-connected Inverters," Drivetech, Inc., Oct. 8, 2006, 6 pages.

(Continued)

*Primary Examiner* — Michael Rutland Wallis
(74) *Attorney, Agent, or Firm* — Perkins Coie LLP (57) ABSTRACT

A system and method for detecting islanding in a Distributed Generation utility grid is described. In some examples, the system, via an inverter, injects a frequency disturbance to a location of the utility grid associated with a DG generator, measures both the frequency error due to the disturbance and the frequency drift of the location of the utility grid, and determines islanding based on a maximum value of the frequencies. In some cases, the system is able to reduce or minimize the Non-Detection Zone of the inverter by detecting islanding without always relying on a detectable frequency error due to an injected waveform.

25 Claims, 5 Drawing Sheets

OTHER PUBLICATIONS

G.A. Kern, R.H. Bonn, J. Ginn, S. Gonzales, "Result of Sandia National Laboratories Grid-tied Inverter Testing," Sandia National Laboratories, 6 pages.

S. Gonzales, R. Bonn, J. Ginn, "Removing Barriers to Utility Interconnected Photovoltaic Inverters," 28th IEEE Photovoltaic Specialist Conference, Anchorage, AK, Sep. 15-22, 2000, 4 pages.

V. John, Z. Ye, A. Kolwalkar, "Investigation of Anti-Islanding Protection of Power Converter Based Distributed Generators Using Frequency Domain Analysis," Sandia National Laboratories, 7 pages.

W. Bower, M. Ropp, "Evaluation of Islanding Detection Methods for Photovoltaic Utility-Interactive Power Systems," IEA Task V Report IEA-PVPS T5-09: 2002, Mar. 2002, 59 pages.

W. Bower, M. Ropp, "Evaluation of Islanding Detection Methods for Utility-Interactive Inverters in Photovoltaic Systems," SAND2002-3591, Nov. 2002, 60 pages.

Non-Final Office Action for U.S. Appl. No. 11/400,716, Mail Date Nov. 1, 2007, 11 pages.

Notice of Allowance for U.S. Appl. No. 11/400,716, Mail Date Jul. 14, 2008, 7 pages.

* cited by examiner

SYSTEM AND METHOD FOR ANTI-ISLANDING, SUCH AS ANTI-ISLANDING FOR A GRID-CONNECTED PHOTOVOLTAIC INVERTER

CROSS REFERENCE TO RELATED APPLICATIONS

This application claims priority to U.S. Provisional Patent Application No. 60/851,640, filed on Oct. 13, 2006, entitled THE HYBRID FREQUENCY SHIFT (HFS) ANTI-ISLANDING METHOD FOR GRID-CONNECTED INVERTERS, which is hereby incorporated by reference in its entirety.

BACKGROUND

Distributed Generation (DG) involves generating electricity from many small energy sources. For example, solar panels on a building, wind turbines in an open field or hydro-engines in an ocean can act as small energy generation sources, or DG generators, that provide energy to a utility grid. Utility consumers, such as buildings located in urban and other densely populated locations, connect DG generators to the utility grid in order to supply power back to the grid to offset some or all use of power supplied by the utility grid. For example, the consumer may trade energy produced by their DG generator to the utility (such as via a metering agreement) in order to lower their overall energy costs.

At times, a power failure of the utility grid or other service interruption will occur that causes the consumer to be disconnected from and not receive power from the utility grid. However, the consumer will continue to receive power from the DG generator. Due to the service interruption, the DG generator will be disconnected from the utility grid, yet will continue to energize the portion of the utility grid allotted to the consumer. This condition, known as "islanding," can be problematic. Islanding occurs when a portion of the utility grid is becomes isolated from the rest of the grid yet continues to receive power from a DG generator. Some hazards associated with islanding include:

(1) Utility workers sent out to repair the utility grid may not be aware that the portion of the utility grid is receiving power from a DG generator even though the utility grid itself is not powered. Serious injury or death may occur should a worker make contact with a portion of the utility grid;

(2) The utility has little or no control over the voltage or frequency supplied to an islanded location which creates the possibility of damage or potential hazards at the islanded location;

(3) It may interfere with restoration of normal service; and so on.

To that end, there have been many systems developed that attempt to quickly and effectively detect islanding. These systems aim to detect islanding within a certain time period and aim to minimize the range of the Non-Detection Zone (NDZ). The NDZ is the range of the local loads (i.e., the load on the islanded location containing the DG generator) that are not detected by an anti-islanding system.

Some of these systems employ active detection methods within inverters associated with DG generators within the utility grid. An active system will deliberately introduce a change and/or disturbance (such as a transient or harmonic disturbance) through connections to the utility grid and monitor any response back from the utility grid. When the utility grid is connected and supplying power to the location containing the DG generator, there will be little or no effect to the frequency, voltage, or impedance of the utility grid. However, when the utility grid is disconnected from the DG location (or otherwise not supplying power), the disturbance will affect the load on the utility grid, and the inverter will cease converting and/or delivering power to the DG location within the utility grid. Thus, anti-islanding will take place.

For inverters containing microcontrollers, such as many photovoltaic (PV) inverters, a number of positive-feedback mechanisms have been developed that can be implemented into the inverter to detect islanding. For example, the "Frequency Bias" Method injects a waveform into the utility grid that attempts to change the frequency of the utility grid. The utility grid will absorb any attempted changes to the frequency when the utility grid is connected to the DG location. However, when the grid is disconnected, the waveform will reflect the changed frequency. This can lead to a frequency and phase error at subsequent measurement cycles. Once the increase (or, decrease) in frequency of the inverter reaches a threshold value, the system identifies an islanding condition and the causes the inverter to stop converting power.

The Frequency Bias method must introduce a large frequency bias to be a reliable anti-islanding mechanism, which can lead to the generation of unwanted audible noise and harmonic currents that deteriorate the power factor of an inverter. Additionally, the method is not preferable for utility grids containing multiple inverters unless every inverter contributes a frequency bias having the same direction so as not to cancel out one another. This can only be achieved when every inverter manufacturer agrees on a direction, which is not likely. Additionally, the Non-Detection Zone (NDZ) of the Frequency Bias Method is generally larger than other active methods, making it a relatively poor method for detection.

The "Sandia Frequency Shift" (SFS) Method extends the Frequency Bias method by injecting a waveform into the utility grid that attempts to change the frequency of the voltage of the utility grid. When the utility grid is disconnected, the measured frequency increases (or, decreases), and a difference in frequency ($\Delta f$), or error frequency, between the measured frequency and an average value of the frequency also increases. The inverter will likewise increase its frequency to compensate for the increased frequency error. The system will shut down the inverter once the inverter frequency reaches a threshold value above or below a normal operational value.

Despite having a relatively small NDZ for active systems, the SFS method also suffers from a number of drawbacks. For example, the instability of the power output can lead to undesirable transient behaviors in weak utility grids. This can be somewhat corrected by reducing loop gain, but gain reduction in this system increases the time to reach the threshold frequency error. Additionally, this method can not accurately detect islanding where there is no detectable frequency error (such as when generated power and load power are balanced).

These and other problems exist with respect to current anti-islanding systems and methods implemented within distributed generation inverters.

DETAILED DESCRIPTION

A system and method for detecting islanding of an inverter using a positive feedback mechanism is described. In some examples, the system detects islanding without requiring a detectable change in frequency of the islanded location of the utility grid. For example, the system may detect an islanding condition even though a measured frequency error of the utility grid is zero or may detect the islanding condition based on the measured frequency error being positive or negative. That is, the system may detect islanding by measuring the natural frequency drift within a utility grid or may detect islanding by measuring an error in frequency due to an injected minimum frequency disturbance.

In some examples, the system determines the higher of (1) a minimum disturbance value for the frequency (due to drift from a resonant frequency of a utility grid) or (2) an error value for the measured frequency, calculates a frequency bias based on the higher value, and calculates an output frequency for the utility grid based on the calculated frequency bias. The output frequency can then be used to detect islanding at a location of the utility grid receiving power from a DG generator.

In some examples, the system is able to minimize the incremental increases (or, decreases) in output frequencies during each cycle of the loop. Thus, the loop gain (G) of the feedback mechanism is minimized which reduces much of the transient instabilities applied to the utility grid by the system. Additionally, a high loop gain reduces the likelihood of false trips, such as those that cause the system to detect an islanding condition even when the DG location is connected to and receiving power from a utility grid.

The system will now be described with respect to various embodiments. The following description provides specific details for a thorough understanding of, and enabling description for, these embodiments of the system. However, one skilled in the art will understand that the system may be practiced without these details. In other instances, well-known structures and functions have not been shown or described in detail to avoid unnecessarily obscuring the description of the embodiments of the system.

It is intended that the terminology used in the description presented below be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

Suitable System

Figure 1:
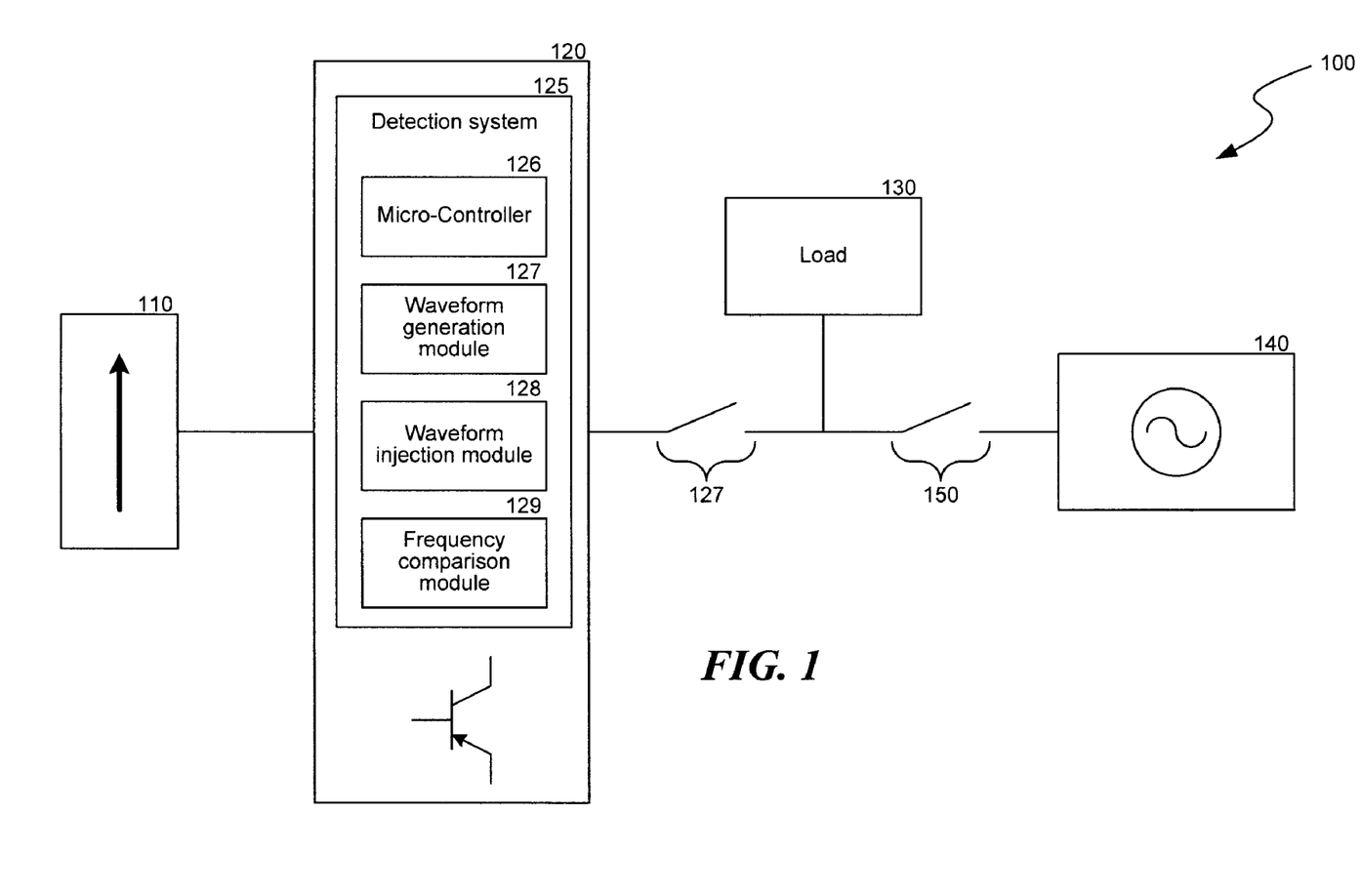
FIG. 1 is a block diagram illustrating an anti-islanding detection system for a distributed generator.

FIG. 1 is a block diagram illustrating an anti-islanding detection system for a distributed generation system 100. The DG system 100 includes a DG generator 110, such as a PV array, a wind turbine, a hydro-engine, and so on. The DG generator is connected to an inverter 120 that converts DC voltage received from the DG generator 110 to AC voltage that can be supplied to a utility grid 140. Additionally, a load 130 is connected to the inverter 120 and the utility grid 140. The load 130 shown in the Figure acts to mimic a possible load on the DG location due to islanding. A typical RLC circuit can act to model the load 130 on the DG location.

The system also includes a detection system 125, located within the inverter. The detection system performs many of the routines discussed herein, and communicates with, instructs, and/or causes the circuitry within the inverter (such as switch 127) to shut down or impede the power conversion and power supply capabilities of the inverter 120. One of ordinary skill in the art will appreciate that although the detection system 125 is shown as being contained by the inverter 120, other configurations are of course possible. For example, the detection system 125 may reside externally, may reside as a separate detection module, or may be adapted to plug in or otherwise connect to an inverter that lacks a suitable detection mechanism, among other configurations.

Furthermore, the system includes a switch 150 whose state represents the state of the distributed generation system 100. When the switch 150 is open (as shown in the Figure), the utility grid 140 is considered to be disconnected from the DG location, and islanding can occur at the DG location. That is, the load 130 will receive power from the DG generator 110 (via the inverter 120) despite not being connected to the utility grid 140. When the switch 150 is closed (not shown), normal operation takes place and the DG generator supplies power to a connected utility grid 140. Thus, the detection system 125 seeks to identify any situations when the switch 150 is open in order to implement preventative measures that lead to anti-islanding of the DG generator location.

FIG. 1 and the discussion herein provide a brief, general description of a suitable distributed generation system, utility grid, and/or inverter in which the system can be implemented. Although not required, aspects of the system are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: multi-processor systems, microprocessor-based or programmable consumer electronics, plug-in modules, network PCs, mini-computers, and the like.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed within an inverter, over a wired system, over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network.

Figure 2:
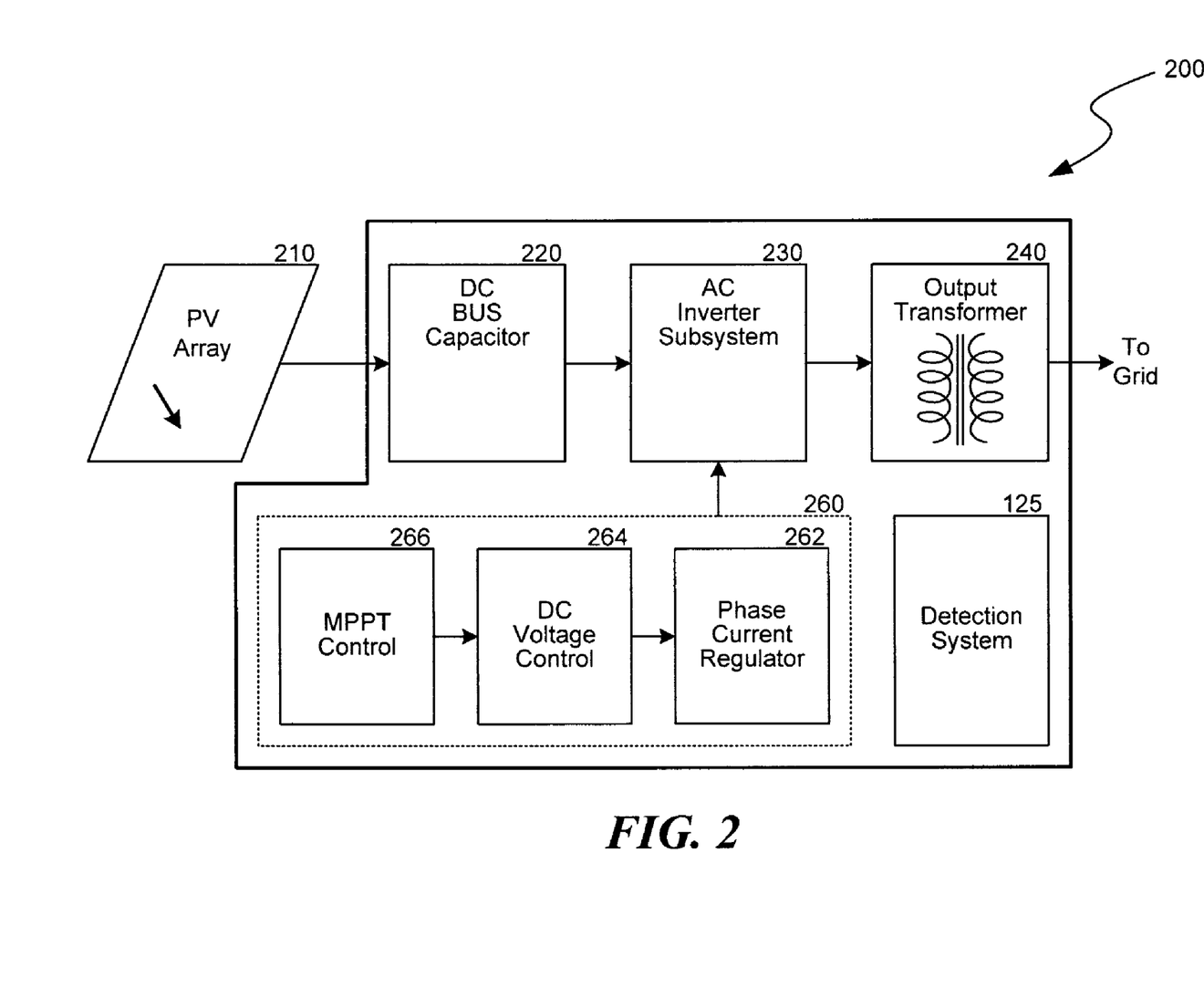
FIG. 2 is a block diagram illustrating components of a photovoltaic inverter containing the detection system.

As discussed herein, in some examples the detection system 125 is located within an inverter that converts power created by a PV array and supplies the power to a utility grid and may include a micro-controller 126, a waveform generation module 127, a waveform injection module 128, and a frequency comparison module 129. FIG. 2 is a block diagram illustrating a PV array inverter 200 containing an anti-islanding. detection system. DC voltage generated from a PV array 210 is connected to a DC bus capacitor bank 220, which acts as a buffer for dynamic loads (required for the inverter 200). The AC inverter subsystem 230 converts DC voltage to AC voltage through a set of power semiconductor switches, which are controlled by an intelligent DSP (Digital Signal Processor) or a high performance micro-controller 126. An output transformer 240 (optional) may provide Galvanic isolation between the DC bus 220 to the utility grid 250 and/or also steps up or down the voltage to meet the voltage level of the utility grid 250. Because the amount of power generated from the PV array 210 is determined by the DC voltage, the inverter 200 regulates the DC voltage and determines the amount of current based on the regulation.

For example, the inverter 200 may employ a regulation mechanism that includes a phase current regulator 262, a DC voltage controller 264, and an MPPT (Maximum Power Point Tracking) component 266 that controls the DC voltage at the level which generates maximum power under varying conditions. Inside the regulation mechanism 260, the inverter 200 is configured as an AC current source for the utility grid 250. For maximum efficiency, the current phase for AC voltage produced by the inverter 200 should match the grid voltage, resulting in power factor unity between the voltage of the utility grid 250 and the voltage of the inverter 200.

Although not shown, the inverter 200 may include various protection mechanisms, such as high temperature prevention mechanisms and high current prevention mechanisms to protect the system from unusual operating conditions and to maintain performance reliability. Additionally, the inverter 200 contains the detection mechanism 125, to be discussed herein. The detection mechanism may employ any and all components of the inverter 200 when performing routines that detect islanding at or near a location of the inverter 200 within the utility grid 250. For example, the detection mechanism 125 may employ a micro-controller, a digital signal processor, or other component in order to inject disturbances, such as waveforms, into the voltages supplied by the inverter 200.

Detection of Islanding

Figure 3:
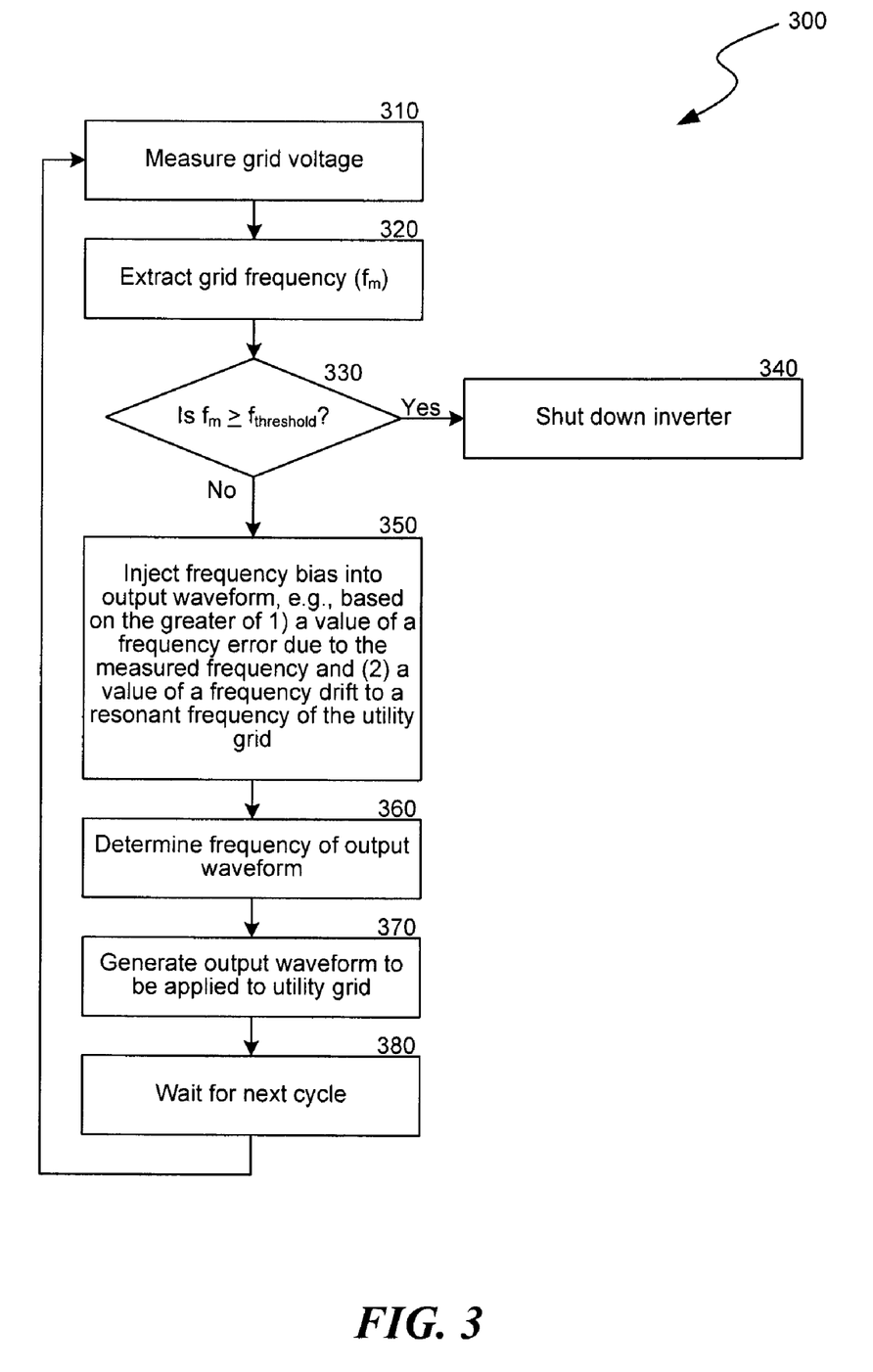
FIG. 3 is a flow diagram illustrating a routine for detecting islanding.

As discussed herein, the detection mechanism 125 performs routines and/processes that detect parameters of the load on the utility grid. Referring to FIG. 3, a flow diagram illustrating a routine 300 for detecting islanding at a DG location is shown. In step 310, the system measures the grid voltage. For example, the system measures the voltage of the utility grid at a DG location (such as a location receiving power from a PV array). In step 320, the system extracts the grid frequency (fm) at that time (i.e., the instantaneous grid frequency) from the measured grid voltage. In step 330, the system determines if the extracted grid frequency is greater than a threshold frequency associated with a likely islanding condition. If the extracted grid frequency is above the threshold frequency (or, alternatively, falls below a certain threshold value), routine 300 proceeds to step 340 and the system (or other components) shut down the inverter or otherwise prevent the inverter from supplying power to the islanded location of the utility grid. For example, the system may open a switch 127 in order to disconnect the inverter from the utility grid. If the extracted frequency does not meet or exceed a threshold frequency, then routine 300 proceeds to step 350.

In step 350, the system injects a frequency bias into an output waveform to generate an output waveform based on the measured instantaneous grid frequency. Further details regarding the determination of the frequency bias and the generation of the waveform will be discussed with respect to FIG. 4.

Figure 4:
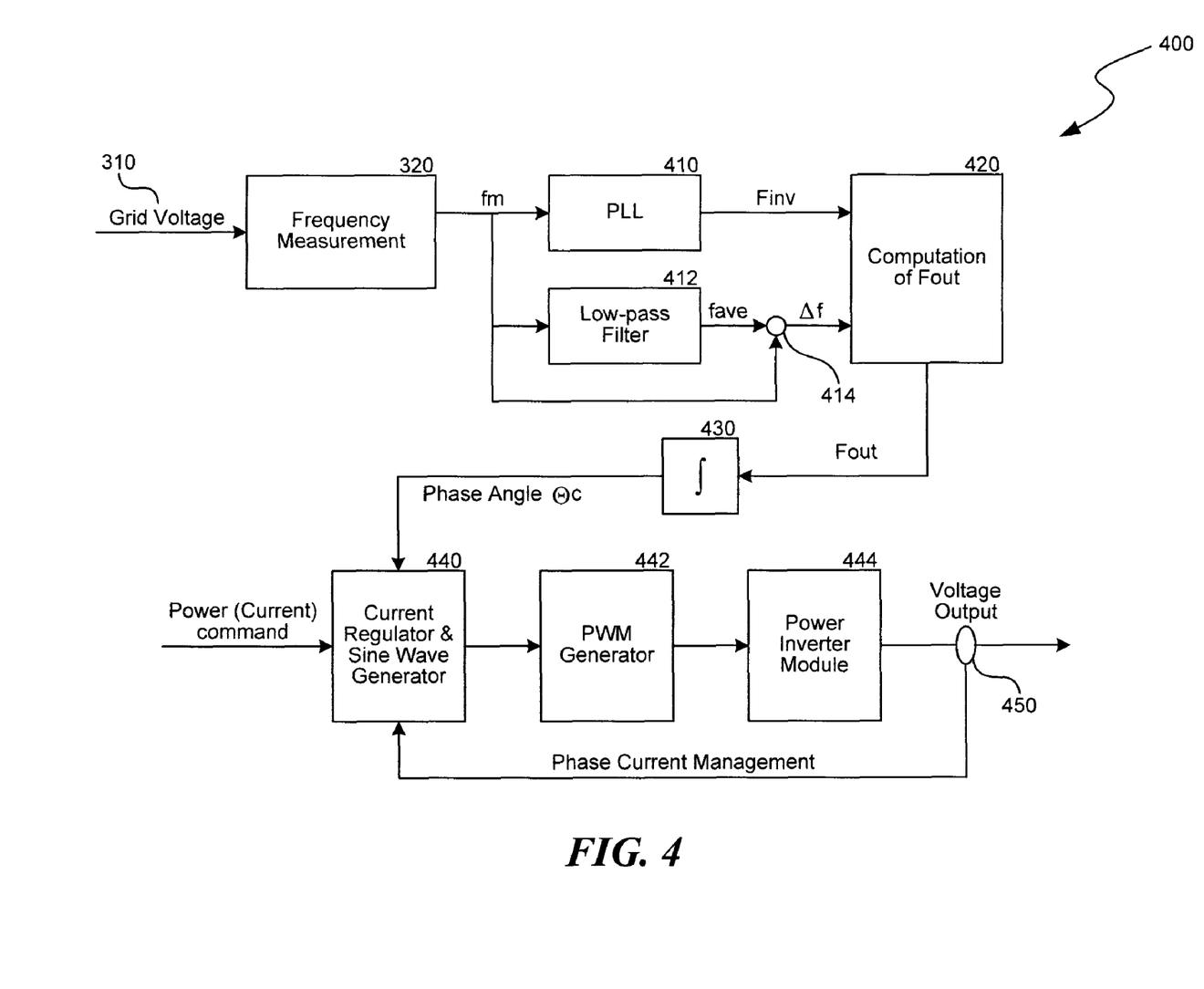
FIG. 4 is a block diagram illustrating a routine employed by the detection block of FIG. 3.

Referring to FIG. 4, a block diagram illustrating processes performed by step 330 of routine 300 is shown. In block 410, the instantaneous measured grid frequency passes through a Phase Lock Loop to determine the frequency bias of the inverter. In block, 412, the instantaneous measured grid frequency passes through a low-pass filter to determine the average frequency of the utility grid (such as an average of the frequencies of the utility grid over a certain period of time). At block 414, the average frequency is subtracted from the instantaneous measured grid frequency to determine the frequency error ($\Delta f = fm - fave$).

In block 420, the frequency error ($\Delta f$) and the instantaneous measured grid frequency (fm) are then input into the following set of equations to determine an output frequency that is used to generate a waveform to be applied to the utility grid voltage.

$$S = \text{sign}(\Delta f)$$

$$\Delta F = \max(S\Delta Fo, G\Delta f)$$

$$Fout = Finv + \Delta F$$

That is, the system calculates the sign of the frequency error to determine the direction (positive or negative) of the frequency bias ($\Delta F$). This sign is then applied to a minimum disturbance value ($\Delta Fo$) with a defined direction. The minimum disturbance value may be related to the natural frequency drift of the utility, such as the frequency drift away from or towards a resonant frequency. The minimum disturbance value is not dependent on the magnitude of the frequency error, only on the sign of the frequency error. Thus, there will be a positive value when the disturbance frequency and the frequency error are in the same direction and a negative value when they are in opposite directions. In addition, the system also calculates a value equal to the loop gain (G) times the frequency error.

The system then calculates the frequency bias as the larger of either the (1) minimum frequency disturbance value times the direction of the frequency error or (2) the loop gain times the frequency error. If the frequency error is large, the frequency bias ($\Delta F$) will be determined by the product of the frequency error and a loop gain. If the frequency error is small, the frequency bias ($\Delta F$) will be determined by the minimum disturbance value of the frequency when the frequency error and the minimum disturbance value are in the same directions. The system can then calculate an outputted frequency bias as being the frequency bias of the inverter plus the calculated frequency bias.

As is shown above, when the utility grid is connected with the inverter, the frequency bias of the grid is at or near zero (due to the utility grid not being affected by the frequency bias from the inverter), and the outputted frequency bias is only the frequency bias of the inverter. Thus, the system will not detect an islanding condition at the DG location. When the utility grid is not connected, the system will detect islanding due to the presence of the additional frequency bias resulting from the disconnected utility grid.

However, during some islanding conditions (such as when the load frequency matches or is near the inverter frequency), there may be little or no measured frequency error. The "max" function discussed above enables the system to determine islanding during these conditions, reducing or eliminating the NDZ for the inverter. For example, a positive minimum disturbance value that is greater than the frequency error will cause the system to detect islanding, even though the frequency error is too low to cause detection in typical systems.

Referring back to FIG. 4, in block 430 the system integrates the outputted frequency bias to determine a phase angle (Θc=∫Fout dt). The system then uses the resultant phase angle to generate an output waveform for the inverter. For example, in block 440 the phase angle and a power command are input into a current regulator and a sine wave generator. In block 442, the generated sine wave from block 440 is then input into a PWM (Pulse Width Modulation) generator to control the power to be applied by the waveform to the utility grid load at the DG location. In block 444, a power inverter module further conditions the waveform, and outputs a waveform to the load on the DG location of the utility grid. Additionally, the phase current is measured and transmitted to the sine wave generator of block 440.

Referring back to FIG. 3, the system, in step 360, determines the frequency of the output waveform using the process of FIG. 4. In step 370, the system generates an output waveform to be applied to the utility grid, and applies the output waveform to the grid. For example, the system injects the generated output waveform (or at least a portion of the generated output waveform) into the utility grid, in order to change the frequency of the voltage of the utility grid (or to augment any changing frequency). As discussed herein, the output waveform may be a waveform that is a function of the frequency error in the grid based on the instantaneous frequency of the grid, or may be a waveform that is a function of a frequency drift in the same direction of the frequency drift within the utility.

In step 380, the system waits for the next voltage cycle, and proceeds back to step 310. Thus, the routine will continue to follow a positive feedback loop until the measured frequency of the utility grid rises above a threshold value. At that point, the system will cease to provide power from the inverter to the utility grid.

Example Use Cases

UL1741 specifies various islanding testing methods that an inverter should pass before being implemented into a DG system. The islanding tests were performed using UL1741 guided testing configurations, including a utility grid simulation using a power-electronics-based variable AC voltage source (Pacific—50 kW/62 kVA). For example, during an islanding test, a contactor disconnects the utility and isolates the loads at the location of the inverter. The time required for the inverter to cease energizing its output following loss of utility is then monitored and recorded. The load conditions specified by the standards discussed above included mismatches between inverter output and load. Because the specified degree of mismatch is highly probable, the standards require that the inverter cease to energize very quickly (e.g., within 2 seconds) in order to avoid interference with high-speed re-closing relays. Additionally, additional load conditions specified by the standards include matching a 60-Hz resonant RLC load to the output of the inverter. With these load conditions, removal of the utility does not result in a detected change to the voltage or frequency at the inverter terminals using conventional methods.

Figure 5:
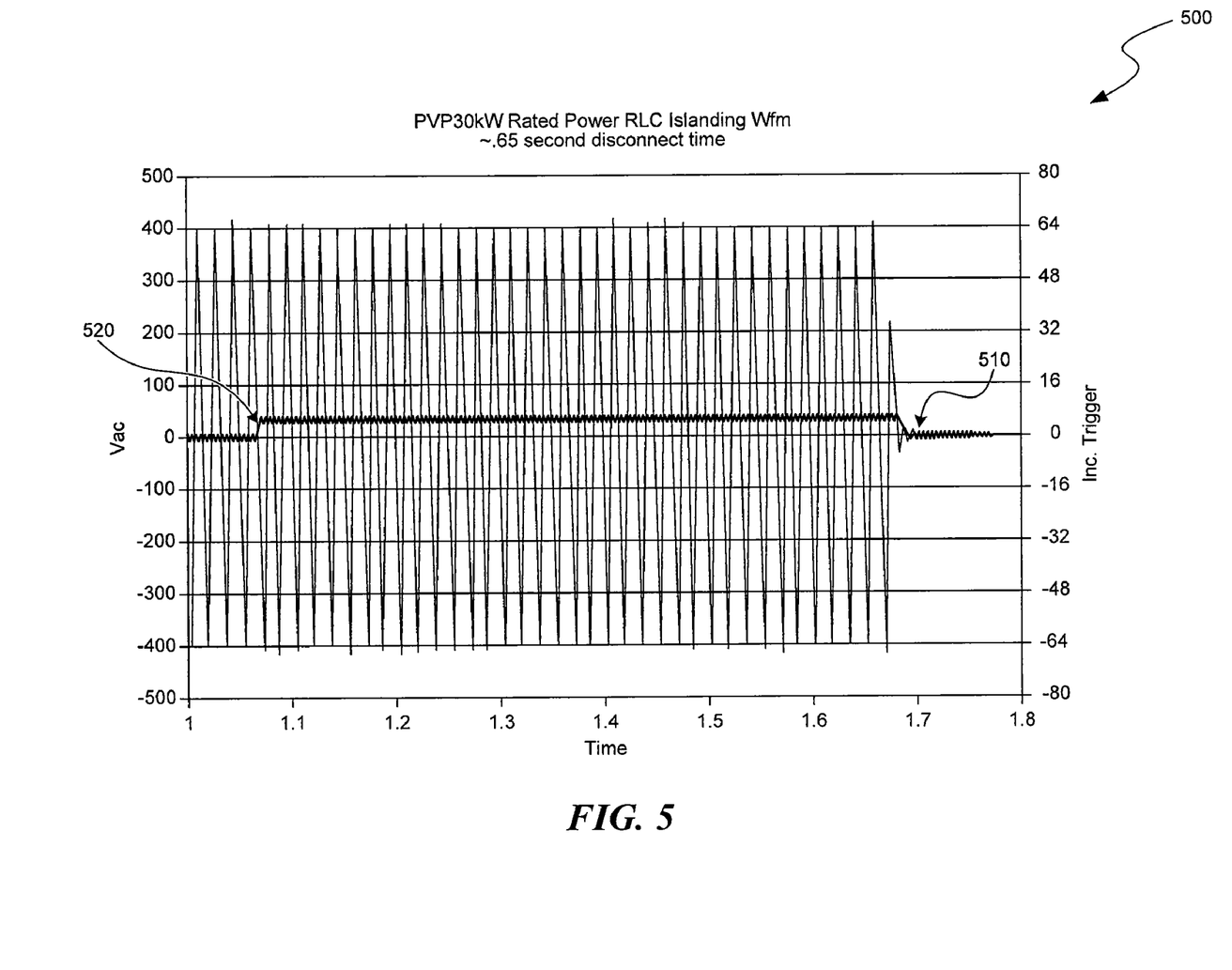
FIG. 5 is a graph illustrating a measured islanding condition using the detection system.

IEEE 1547 and UL 1741 require that a generation source shut down within two seconds following loss of utility with matched 60 Hz resonant RLC loads and the standards require that ten islanding tests be performed at each of three power levels—33%, 66%, and 100%, of rated power. At each power level, the resistive load was adjusted to absorb all real power from the inverter, and the reactive loads were adjusted to absorb all reactive power from the inverter. An RLC tank circuit was adjusted to have a quality factor (vars/Watts ratio) of 1 and was then tuned for 60-Hz resonance. The 60 Hz resonant tank circuit provides stored energy at 60 Hz and the matched resistive load provides voltage regulation. The following table lists the longest measured islanding durations of the tests conducted at each power level and FIG. 5 show an associated waveform for the 100% of rated power tests. In these figures, the step in the "trigger" waveform coincides with removal of the utility. These results indicate the inverter met all matching condition (RLC 60 Hz) islanding tests that were performed.

| Load Power (= Inverter Power) | Longest Measured Trip Time at Each Power Level |
| --- | --- |
| 33% of rated power | 1.97 seconds |
| 66% of rated power | .24 seconds |
| 100% of rated power | .65 seconds |

Referring to FIG. 5, a graph 500 that illustrates as associated waveform during islanding tests performed with inverters having the detection system described herein is shown. The step in the waveform 520 shows the time of utility disconnection, and the point 510 shows where the inverter power ceases, about 0.65 seconds later. Thus, the system described herein quickly and effectively shuts down operation of an inverter within the established standard time period.

Among other advantages, the system provides the following benefits to an inverter:

The system provides for effective anti-islanding without relying on additional methods to cover an area of an NDZ (e.g., many conventional inverters employ the SFS method and a Sandia Voltage Shift (SVS) method simultaneously for reliable detection of islanding). The system described herein further reduces the NDZ associated with the SFS and thus does not need to rely on other methods.

Because the system considers the minimum frequency disturbance when determining the frequency bias, faster response times under most, if not all, islanding conditions, can be achieved (even during islanding conditions that present a zero frequency error). Additionally, the system does not need to set the positive feedback gain G at a high level, and can use gain values considerably lower than conventional systems when calculating frequency bias. Thus, the inverter is less prone to nuisance trips and prevents instability due to the injection of higher gain values into a utility grid that may cause undesirable transient behaviors in weak utility grids.

The system reduces the frequency distortion during normal operation (that is, during non-islanding conditions). For example, the minimum injected frequency bias will be smaller than that of conventional methods.

When multiple inverters are connected to a DG location of a utility grid, all of the inverter frequencies drift in the same direction because the direction of frequency bias a following cycle is determined by the frequency error. Thus, the system enables parallel operation of multiple inverters at the same grid location without degradation of its anti-islanding detection capability.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

While many embodiments described above employ software stored within the inverter the software noted above may be hard coded into the inverter (e.g. stored in EEPROM, PROM, etc.). Further, the above functionality may be implemented into an inverter before, during, or after manufacture of the inverter.

The teachings of the system provided herein can be applied to other systems, not necessarily the system described herein. For example the system may be implemented with inverters that convert energy from a variety of DG generation sources, including wind turbines, hydro-power engines, and so on. The elements and acts of the various embodiments described above can be combined to provide further embodiments.

All of the above patents and applications and other references, including any that may be listed in accompanying filing papers, are incorporated by reference. Aspects of the system can be modified, if necessary, to employ the systems, functions, and concepts of the various references described above to provide yet further embodiments of the system.

These and other changes can be made to the system in light of the above Detailed Description. While the above description details certain embodiments of the system and describes the best mode contemplated, no matter how detailed the above appears in text, the system can be practiced in many ways. Details of the local-based support system may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. For example, while only one aspect of the system is recited as embodied in an inverter, other aspects may likewise be embodied in an inverter. Accordingly, the inventors reserve the right to add additional claims after filing the application to pursue such additional claim forms for other aspects of the system.

I claim:

1. A method for detecting islanding at a location of a utility grid associated with a distributed generation system, the method comprising:
   receiving a frequency of the location of the utility grid associated with the distributed generation system;
   determining a frequency bias based on a greater of (1) a first value based on a frequency error associated with the frequency of the location of the utility grid, and (2) a second value based on application of a sign of the frequency error to a disturbance value; and
   injecting a generated waveform into the location of the utility grid associated with the distributed generation system, wherein the waveform is generated based on the frequency bias.

2. The method of claim 1 wherein the frequency of the location of the utility grid is a first frequency and wherein the method further comprises:
   receiving a second frequency of the location of the utility grid associated with the distributed generation system;
   comparing the second frequency of the location of the utility grid with a threshold frequency; and
   detecting islanding at the location of the utility grid associated with the distributed generation system if the second frequency of the location of the utility grid meets or exceeds the threshold frequency.

3. The method of claim 1, further comprising determining the frequency error based on a difference between the frequency of the location of the utility grid and an average frequency for the location of the utility grid.

4. A method in an inverter for detecting islanding at a location of a utility grid associated with a photovoltaic array, the method comprising:
   measuring a frequency of the location of the utility grid associated with the photovoltaic array; and
   injecting a frequency disturbance into the location of the utility grid associated with the photovoltaic array; wherein the frequency disturbance is based on a greater of (1) a value of a frequency error due to the measured frequency and (2) a value of a frequency drift to a resonant frequency of the utility grid, wherein the value of the frequency error due to the measured frequency includes a value for loop gain times a value for a difference between the measured frequency and an average frequency for the utility grid.

5. A system for detecting islanding at a location of a utility grid receiving power from one or more power generation sources via one or more inverters, the system comprising:
   a waveform generation module configured to generate a waveform based on a calculated frequency bias, wherein the calculated frequency bias includes an inverter frequency component and a frequency bias component, and wherein the frequency bias component is based on a greater of
1) a first value based on a frequency error associated with a frequency of the utility grid, and
2) second value based on a direction of the frequency error and a disturbance value;
a waveform injection module configured to inject the generated waveform into the utility grid; and
a frequency comparison module configured to compare the frequency of the utility grid with a threshold frequency and provide an indication of islanding if the frequency of the utility grid meets or exceeds the threshold frequency.

6. The system of claim 5, wherein the frequency of the utility grid changes to compensate for a changed load frequency.

7. The system of claim 5, wherein, if the frequency of the utility grid does not meet the threshold frequency, the waveform generation module is further configured to generate an additional waveform and the waveform injection module is further configured to inject the generated additional waveform into the utility grid.

8. The system of claim 5, further comprising:
an islanding prevention module that interrupts provision of power by the inverter to the utility grid in response to an indication of islanding provided by the frequency comparison module.

9. An inverter configured to supply power to a utility grid, the inverter comprising:
a power reception subsystem configured to receive generated direct current power from a power generation source;
a current inverter subsystem configured to convert the received direct current power to alternating current power; and
an anti-islanding subsystem configured to cause the supply of power to the utility grid to be interrupted, wherein the anti-islanding subsystem includes:
a waveform injection module configured to inject a waveform into the utility grid; and
a frequency module configured to determine a frequency bias based on a greater of 1) a first value based on a frequency error associated with a frequency of the utility grid and 2) a second value based on a direction of the frequency error and a disturbance value,
wherein the injected waveform is based on the determined frequency bias.

10. The inverter of claim 9, wherein the power generation source includes a photovoltaic array.

11. The inverter of claim 9, wherein the power generation source includes a wind turbine.

12. The method of claim 1 wherein determining the frequency bias includes determining the frequency bias according to the equation $\Delta F = \max(S \Delta F_o, G \Delta f)$, where (S) is a sign of the frequency error, ($\Delta F_o$) is the disturbance value, (G) is a gain, and ($\Delta f$) is the frequency error.

13. The method of claim 1 wherein the disturbance value is based on a frequency drift of the location of the utility grid with respect to a resonant frequency.

14. The method of claim 1 wherein the first value is further based on a gain.

15. The system of claim 5 wherein the waveform generation module is a first waveform generation module, the waveform injection module is a first waveform injection module, the frequency comparison module is a first frequency comparison module, and wherein the system further comprises:

a first inverter that includes the first waveform generation module, the first waveform injection module, and the first frequency comparison module; and
a second inverter that includes:
a second waveform generation module configured to generate a waveform based on a calculated frequency bias, wherein the calculated frequency bias includes an inverter frequency component and a frequency bias component, and wherein the frequency bias component is based on a greater of
1) a first value based on a frequency error associated with a frequency of the utility grid, and
2) a second value based on a direction of the frequency error and a disturbance value;
a second waveform injection module configured to inject the generated waveform into the utility grid; and
a second frequency comparison module configured to compare the frequency of the utility grid with a threshold frequency and provide an indication of islanding if the frequency of the utility grid meets or exceeds the threshold frequency.

16. The system of claim 5 wherein the frequency bias component ($\Delta F$) is determined according to the equation $\Delta F = \max(S \Delta F_o, G \Delta f)$, where (S) indicates the direction of the frequency error, ($\Delta F_o$) is the disturbance value, (G) is a gain, and ($\Delta f$) is the frequency error.

17. The system of claim 16 wherein the frequency error ($\Delta f$) is determined according to the equation $\Delta f = f_m - f_{ave}$, where ($f_m$) is an instantaneous frequency of the utility grid and ($f_{ave}$) is an average frequency of the utility grid.

18. The system of claim 5 wherein the disturbance value is based on a frequency drift of the utility grid.

19. The system of claim 5 wherein the first value is further based on a gain.

20. The inverter of claim 9 wherein the frequency module is further configured to determine the frequency bias ($\Delta F$) according to the equation $\Delta F = \max(S \Delta F_o, G \Delta f)$, where (S) indicates the direction of the frequency error, ($\Delta F_o$) is the disturbance value, (G) is a gain, and ($\Delta f$) is the frequency error.

21. The inverter of claim 20 wherein the frequency module is further configured to determine the frequency error ($\Delta f$) according to the equation $\Delta f = f_m - f_{ave}$, where ($f_m$) is an instantaneous frequency of the utility grid and ($f_{ave}$) is an average frequency of the utility grid.

22. A method of generating an output waveform, the method comprising:
determining a grid frequency of an electrical grid;
determining a first frequency bias based on a greater of 1) a first value based on a frequency error associated with the grid frequency, and 2) a second value based on a disturbance value;
determining a second frequency bias of a power-producing system coupled to the electrical grid;
determining an output frequency bias based on the first frequency bias and the second frequency bias; and
generating, by the power-producing system, a output waveform based on the output frequency bias.

23. The method of claim 22 wherein determining the first frequency bias includes:
determining the first frequency bias ($\Delta F$) according to the equation $\Delta F = \max(S \Delta F_o, G \Delta f)$, where (S) indicates a direction of the frequency error ($\Delta f$), ($\Delta F_o$) is the disturbance value, (G) is a gain; and
determining the frequency error ($\Delta f$) according to the equation $\Delta f = f_m - f_{ave}$, where ($f_m$) is an instantaneous frequency of the electrical grid and ($f_{ave}$) is an average frequency of the electrical grid.

24. The method of claim 22 wherein the first value is further based on a gain and the second value is further based on a direction of the frequency error.

25. The method of claim 22 wherein the disturbance value is based on a frequency drift with respect to a resonant frequency of the electrical grid.

* * * * *

UNITED STATES PATENT AND TRADEMARK OFFICE
CERTIFICATE OF CORRECTION

PATENT NO.         : 7,906,870 B2                                   Page 1 of 1
APPLICATION NO.    : 11/872598
DATED              : March 15, 2011
INVENTOR(S)        : Dal Y. Ohm It is certified that error appears in the above-identified patent and that said Letters Patent is hereby corrected as shown below:

IN THE SPECIFICATIONS:

In column 5, line 10-11, delete "anti-islanding." and insert -- anti-islanding --, therefor.

In column 6, line 30, delete "$\Delta F = \max(S\Delta Fo, G\Delta f)$" and insert -- $\Delta F = \max(S\Delta Fo, G\Delta f)$ --, therefor.

IN THE CLAIMS:

In column 11, line 6, in claim 5, after "2)" insert -- a --.

In column 11, line 55, in claim 12, delete "$\Delta F = \max(S\Delta F_o, G\Delta f),$" and insert
-- $\Delta F = \max(S\Delta F_o, G\Delta f),$ --, therefor.

In column 12, line 66, in claim 23, delete "$(\Delta f)$according" and insert -- $(\Delta f)$ according --, therefor.

Signed and Sealed this
Fourteenth Day of June, 2011

David J. Kappos
*Director of the United States Patent and Trademark Office*